US 11,729,046 B2

(12) United States Patent
Koskinen (10) Patent No.: US 11,729,046 B2
(45) Date of Patent: Aug. 15, 2023

(54) FAILURE INDICATION OF MASTER CELL GROUP WITH FALLBACK TO RADIO RESOURCE CONTROL RE-ESTABLISHMENT

(71) Applicant: Nokia Technologies Oy, Espoo (FI)

(72) Inventor: Henri Markus Koskinen, Espoo (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 142 days.

(21) Appl. No.: 17/268,327

(22) PCT Filed: Feb. 10, 2020

(86) PCT No.: PCT/IB2020/051019
§ 371 (c)(1),
(2) Date: Feb. 12, 2021

(87) PCT Pub. No.: WO2020/165728
PCT Pub. Date: Aug. 20, 2020

(65) Prior Publication Data
US 2021/0203543 A1 Jul. 1, 2021

Related U.S. Application Data

(60) Provisional application No. 62/806,445, filed on Feb. 15, 2019.

(51) Int. Cl.
*H04L 41/0654* (2022.01)
*H04W 76/19* (2018.01)
(Continued)

(52) U.S. Cl.
CPC .......... *H04L 41/0654* (2013.01); *H04L 69/28* (2013.01); *H04W 76/15* (2018.02); *H04W 76/19* (2018.02)

(58) Field of Classification Search
CPC .... H04L 41/0654; H04L 69/28; H04W 76/15; H04W 76/19
See application file for complete search history.

(56) References Cited

U.S. PATENT DOCUMENTS

| 2020/0059395 | A1* | 2/2020 | Chen | H04L 41/0631 |
| 2021/0127447 | A1* | 4/2021 | Zhang | H04W 80/02 |
| 2022/0086710 | A1* | 3/2022 | Xu | H04W 36/305 |

FOREIGN PATENT DOCUMENTS

| CN | 107079514 A | 8/2017 |
| CN | 109151932 A | 1/2019 |

(Continued)

OTHER PUBLICATIONS

"WID on Multi-RAT Dual-Connectivity and Carrier Aggregation Enhancements (LTE_NR_DC_CA_enh-Core)", 3GPP TSG-RAN#81, RP-182076, Agenda : 9.2.2, Ericsson, Sep. 10-13, 2018, 5 pages.

(Continued)

*Primary Examiner* — Jackie Zuniga Abad
(74) *Attorney, Agent, or Firm* — Squire Patton Boggs (US) LLP (57) ABSTRACT

An apparatus of wireless communications comprising at least one processor, and at least one memory including computer program code, wherein the at least one memory and computer program code configured to, with the at least one processor, cause the apparatus at least to: detect a radio link failure of a master cell group; suspend master cell group transmission for radio bearers, based on the detecting; and transmit or report a radio resource control indication over at least one of a signaling radio bearer between the apparatus and a secondary node, or a secondary cell group leg of a split signaling radio bearer.

20 Claims, 3 Drawing Sheets

(51) Int. Cl.
*H04W 76/15* (2018.01)
*H04L 69/28* (2022.01)

(56) References Cited

FOREIGN PATENT DOCUMENTS

| | | | |
|---|---|---|---|
| CN | 111867151 | A | 10/2020 |
| TW | 201831030 | A | 8/2018 |
| WO | 2018/182231 | A1 | 10/2018 |

OTHER PUBLICATIONS

"3rd Generation Partnership Project;Technical Specification Group Radio Access Network;Evolved Universal Terrestrial Radio Access (E-UTRA) and NR;Multi-connectivity; Stage 2 (Release 15)", 3GPP TS 37.340, V15.4.0, Dec. 2018, pp. 1-67.

International Search Report and Written Opinion received for corresponding Patent Cooperation Treaty Application No. PCT/IB2020/051019, dated May 7, 2020, 15 pages.

"Control Plane Signalling Transport for LTE-NR Tight Interworking", 3GPP TSG-RAN WG2 Meeting #97, Tdoc R2-1701344, Agenda : 10.2.2.5, ITRI, Feb. 13-17, 2017, pp. 1-3.

"Fast MCG Recovery in MR-DC", 3GPP TSG-RAN WG2#105, R2-1901413, Agenda : 11.10.5, Ericsson, Feb. 25-Mar. 1, 2019, 3 pages.

"Fast MCG Recovery in NE-DC and NR-DC", 3G PP TSG-RAN WG2#105, R2-1901415, Ericsson, Feb. 25-Mar. 31, 2019, pp. 1-3.

Tentative Rejection received for corresponding Taiwan Patent Application No. 109104794, dated Oct. 13, 2020, 8 pages of office action and 3 pages of Translation available.

Office action received for corresponding Bangladesh Patent Application No. 41/2020, dated Feb. 16, 2021, 1 page of office action.

Office action received for corresponding Taiwan Patent Application No. 109104794, dated May 25, 2021, 5 pages of office action and 2 page of Translation available.

Office action received for corresponding Bangladesh Patent Application No. 41/2020, dated Aug. 31, 2021, 1 page of office action.

First Office Action issued in corresponding Chinese Patent Application No. 202080004849.X dated Feb. 24, 2023, with English summary thereof.

\* cited by examiner

FAILURE INDICATION OF MASTER CELL GROUP WITH FALLBACK TO RADIO RESOURCE CONTROL RE-ESTABLISHMENT

RELATED APPLICATION

This application claims priority to PCT Application No. PCT/IB2020/051019, filed on Feb. 10, 2020, which claims priority to U.S. Application No. 62/806,445, filed on Feb. 15, 2019, each of which is incorporated herein by reference in its entirety.

FIELD

Some example embodiments may generally relate to mobile or wireless telecommunication systems, such as Long Term Evolution (LTE) or fifth generation (5G) radio access technology or new radio (NR) access technology, or other communications systems. For example, certain embodiments may relate to systems and/or methods for failure indication of master cell group.

BACKGROUND

Examples of mobile or wireless telecommunication systems may include the Universal Mobile Telecommunications System (UMTS) Terrestrial Radio Access Network (UTRAN), Long Term Evolution (LTE) Evolved UTRAN (E-UTRAN), LTE-Advanced (LTE-A), MulteFire, LTE-A Pro, and/or fifth generation (5G) radio access technology or new radio (NR) access technology. Fifth generation (5G) wireless systems refer to the next generation (NG) of radio systems and network architecture. 5G is mostly built on a new radio (NR), but the 5G (or NG) network can also build on E-UTRA radio. It is estimated that NR will provide bitrates on the order of 10-20 Gbit/s or higher, and will support at least enhanced mobile broadband (eMBB) and ultra-reliable low-latency-communication (URLLC) as well as massive machine type communication (mMTC). NR is expected to deliver extreme broadband and ultra-robust, low latency connectivity and massive networking to support the Internet of Things (IoT). With IoT and machine-to-machine (M2M) communication becoming more widespread, there will be a growing need for networks that meet the needs of lower power, low data rate, and long battery life. It is noted that, in 5G, the nodes that can provide radio access functionality to a user equipment (i.e., similar to Node B in UTRAN or eNB in LTE) may be named gNB when built on NR radio and may be named NG-eNB when built on E-UTRA radio.

BRIEF DESCRIPTION OF THE DRAWINGS

For proper understanding of example embodiments, reference should be made to the accompanying drawings, wherein.

DETAILED DESCRIPTION

It will be readily understood that the components of certain example embodiments, as generally described and illustrated in the figures herein, may be arranged and designed in a wide variety of different configurations. Thus, the following detailed description of some example embodiments of systems, methods, apparatuses, and computer program products for failure indication of master cell group (MCG), is not intended to limit the scope of certain embodiments but is representative of selected example embodiments.

The features, structures, or characteristics of example embodiments described throughout this specification may be combined in any suitable manner in one or more example embodiments. For example, the usage of the phrases "certain embodiments," "some embodiments," or other similar language, throughout this specification refers to the fact that a particular feature, structure, or characteristic described in connection with an embodiment may be included in at least one embodiment. Thus, appearances of the phrases "in certain embodiments," "in some embodiments," "in other embodiments," or other similar language, throughout this specification do not necessarily all refer to the same group of embodiments, and the described features, structures, or characteristics may be combined in any suitable manner in one or more example embodiments.

Additionally, if desired, the different functions or steps discussed below may be performed in a different order and/or concurrently with each other. Furthermore, if desired, one or more of the described functions or steps may be optional or may be combined. As such, the following description should be considered as merely illustrative of the principles and teachings of certain example embodiments, and not in limitation thereof.

Some example embodiments may relate to dual connectivity (DC) and/or carrier aggregation (CA) enhancements. For example, certain embodiments may relate to fast master cell group (MCG) link recovery that can support fast recovery of MCG link, e.g., by utilizing the secondary cell group (SCG) link and split signaling radio bearers (SRBs) for recovery during MCG failure while operating under DC or multi-radio DC (MR-DC).

3GPP technical specification TS 37.340 currently specifies, for SCG/MCG failure handling, that radio link failure (RLF) is declared separately for the MCG and for the SCG. If radio link failure is detected for MCG, the UE initiates the radio resource control (RRC) connection re-establishment procedure. In E-UTRA-NR DC (EN-DC) and NG-RAN-E-UTRA DC (NGEN-DC), the following SCG failure cases are supported: SCG RLF; secondary node (SN) change failure; SCG configuration failure (only for messages on SRB3); and/or SCG RRC integrity check failure (on SRB3). In some cases, SRB3 may refer to a signalling radio bearer between the UE and a secondary node. In dual connectivity, Signaling Radio Bearer 3 (SRB3) refers to a direct signaling radio bearer between the UE and the dual-connectivity Secondary Node.

In EN-DC and NGEN-DC, upon SCG failure the UE suspends SCG transmissions for all radio bearers and reports the SCG failure information, for example SCG Failure Information, to the master node (MN), instead of triggering re-establishment. The MN handles the SCG Failure Information message and may decide to keep, change, or release the SN/SCG. In all the cases, the measurement results according to the SN configuration and the SCG failure type may be forwarded to the old SN and/or to the new SN.

According to the current approach, upon detecting radio link failure for MCG, the UE initiates RRC connection re-establishment, which entails suspending all radio bearers and releasing its dual-connectivity configuration. This may be excessive if the UE's SCG is still up and running.

An embodiment provides an improved handling of MCG RLF detected by a UE configured in dual connectivity or in multiple cells. In certain embodiments, if the UE is configured with at least one of SRB3 terminated at the UE's secondary node, for example Secondary Node, and/or a split SRB terminated at the UE's master node, for example Master Node, and SCG transmissions are not suspended, MCG transmissions for radio bearers, in some cases for all radio bearers, may be suspended, a RRC indication of MCG failure information, for example "MCG Failure Information", may be reported over at least one of SRB3 and/or the SCG leg of the split SRB, and a timer, for example referred as "MCGFailTimer" or named differently, may be started. For example, the SCG transmission may have been suspended due to a prior detection of SCG failure. The split SRB comprises SRBs served by both the MN and the SN. Furthermore, the MN may be a DC MN; and, the SN may be a DC SN.

In one example, the MCG failure information indication may carry information, such as the cause of failure and/or latest measurement results. According to an embodiment, the timer may be a newly defined timer with a duration configured to the UE by the network by RRC or by the UE itself.

According to some embodiments, if the MCG-failure information is reported over SRB3, in some cases over SRB3 only, some or all the information in it may be relayed by the UE's secondary node (terminating SRB3) to the UE's master node, e.g., over a signaling protocol used between the MN and the SN, for example X2AP/XnAP. It is noted that over the split SRB this will occur naturally.

In an embodiment, the UE may stop the timer, for example referred as MCGFailTimer, upon one or more of the following events: successful reconfiguration or configuration of the UE's primary serving cell, and/or reception of a command to leave RRC_Connected state. According to one embodiment, the UE may trigger RRC connection re-establishment at least upon one or more of the following events: while the timer is running, the UE detects SCG failure or integrity-verification failure on a split SRB for a PDCP PDU received over SCG; and/or the timer expires. This could happen, for example, if the UE's master node has shut down completely.

Figure 1A:
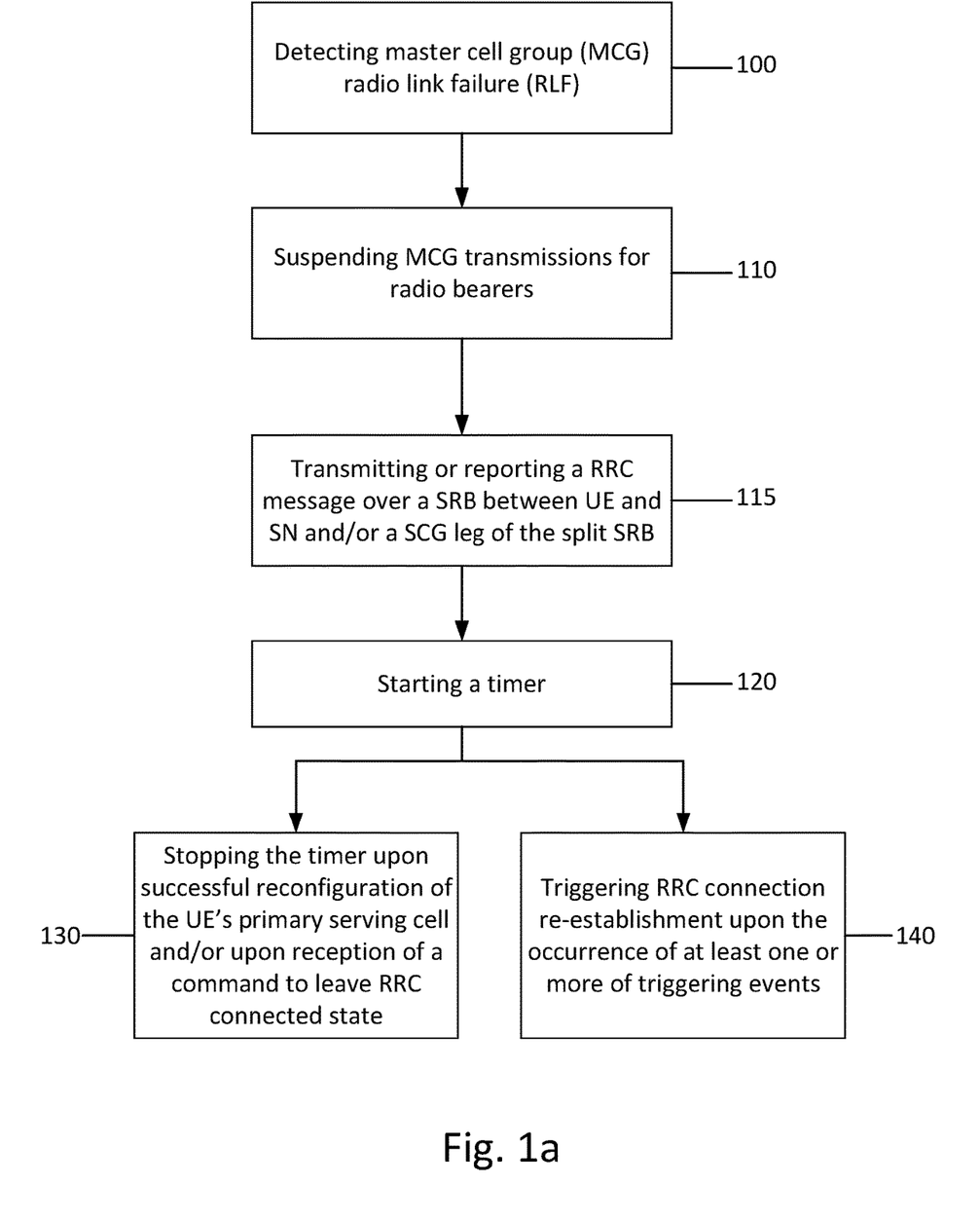
FIG. 1a illustrates an example flow diagram of a method, according to one embodiment.

FIG. 1a illustrates one example flow diagram of a method for failure indication of MCG with fall-back to RRC re-establishment, according to an embodiment. In some embodiments, the method of FIG. 1a may be performed by a node or element in a communications network or associated with such a network, such as a UE, mobile equipment (ME), mobile station, mobile device, mobile-termination module within an Integrated Access and Backhaul (IAB) node, stationary device, IoT device, or other device. As described herein, UE may alternatively be referred to as, for example, a mobile station, mobile equipment, mobile unit, mobile device, mobile termination, user device, subscriber station, wireless terminal, tablet, smart phone, IoT device or NB-IoT device, or the like. According to one example, the UE performing the method of FIG. 1a may be a UE that is configured in DC or in connection with multiple cells.

In one embodiment, the method of FIG. 1a may include, at 100, detecting MCG RLF. According to an embodiment, the method may include determining if the UE is configured with a signaling radio bearer between the UE and the SN and/or a split SRB and if SCG transmissions are suspended. The signaling radio bearer may be a direct signaling radio bearer between the UE and the SN. The SN may be a DC SN. In an embodiment, the signaling radio bearer may be a SRB3. When the UE is configured with the signaling radio bearer and/or a split SRB and SCG transmissions are not suspended, the method may include, at 110, suspending MCG transmissions for radio bearers, transmitting or reporting a RRC indication over the signaling radio bearer (e.g., SRB3) and/or a SCG leg of the split SRB at 115, and starting a timer at 120. In an embodiment, the RRC indication may be a MCG failure information message that includes information on the cause of failure and/or the latest measurement results. According to one embodiment, the timer may be referred to as a "MCGFailTimer" or a different term, and the duration of the timer may be configured to the UE by the network by RRC.

In an embodiment, when the MCG failure information is reported over an SRB terminating at the UE's SN, some or all of the information in the MCG failure information may be relayed by the UE's SN to the UE's MN, e.g., over a signaling protocol used between the MN and the SN, such as X2AP/XnAP. According to certain embodiments, the method may also include, at 130, stopping the timer, for example MCGFailTimer, upon successful reconfiguration or configuration of the UE's primary serving cell and/or upon reception of a command to leave RRC connected state. In some embodiments, the method may include, at 140, triggering RRC connection re-establishment upon the occurrence of at least one or more of triggering events. According to certain embodiments, the triggering events may include at least one of: while the timer is running, detecting SCG failure or integrity-verification failure on a split SRB for a PDCP PDU received over SCG; and/or when the timer expires, for example because the UE's MN has shut down completely.

Figure 1B:
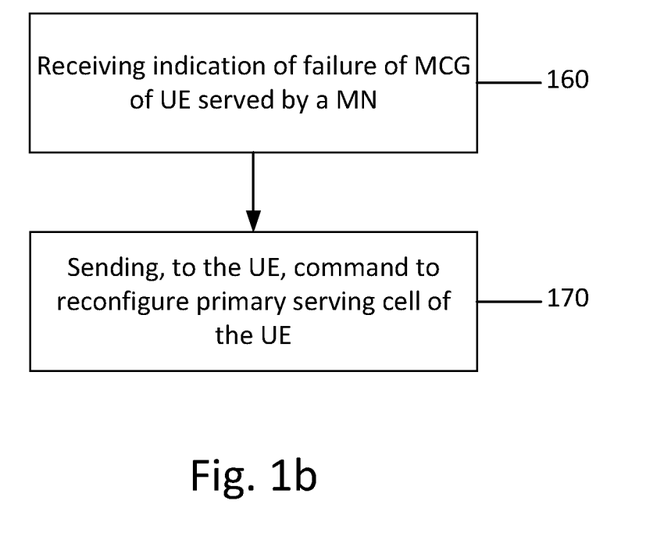
FIG. 1b illustrates an example flow diagram of a method, according to an embodiment.

FIG. 1b illustrates one example flow diagram of a method for failure indication of MCG with fall-back to RRC re-establishment, according to an embodiment. In some embodiments, the method of FIG. 1b may be performed by a node or element in a communications network or associated with such a network, such as a base station, access node, eNB, or gNB. In one example, the method of FIG. 1b may be performed by a DC master node.

In an embodiment, the method of FIG. 1b may include, at 160, receiving, by a MN, an indication of failure of a MCG configured to a UE. According to one embodiment, the UE may be served by the MN. In one example, the MN may be a DC MN. In response to receiving the indication, the method may further include, at 170, sending to the UE a command to reconfigure or configure a primary serving cell of the UE. In an embodiment, the indication may be received over an interface between the MN and a SN. In one example, the indication may indicate the cause of the failure. According to certain embodiments, the indication may indicate results of radio measurements performed by the UE. In some embodiments, the command to reconfigure the primary serving cell may be based at least in part on the measurement results. In one example, the command may be sent via the SN. In one example, the SN may be a DC SN.

Figure 2A:
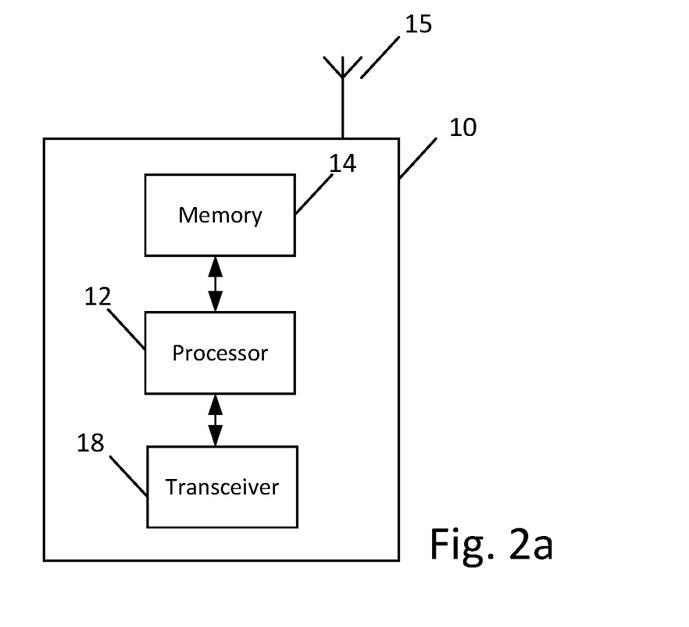
FIG. 2a illustrates an example block diagram of an apparatus, according to one embodiment.

FIG. 2a illustrates an example of an apparatus 10 according to an embodiment. In an embodiment, apparatus 10 may be a node, host, or server in a communications network or serving such a network. For example, apparatus 10 may be a satellite, base station, a Node B, an evolved Node B (eNB), 5G Node B or access point, next generation Node B (NG-NB or gNB), and/or WLAN access point, associated with a radio access network, such as a LTE network, 5G or NR. In example embodiments, apparatus 10 may be an eNB in LTE or gNB in 5G. In other example embodiments, apparatus 10 may be a dual-connectivity master node.

It should be understood that, in some example embodiments, apparatus 10 may be comprised of an edge cloud server as a distributed computing system where the server and the radio node may be stand-alone apparatuses communicating with each other via a radio path or via a wired connection, or they may be located in a same entity communicating via a wired connection. For instance, in certain example embodiments where apparatus 10 represents a gNB, it may be configured in a central unit (CU) and distributed unit (DU) architecture that divides the gNB functionality. In such an architecture, the CU may be a logical node that includes gNB functions such as transfer of user data, mobility control, radio access network sharing, positioning, and/or session management, etc. The CU may control the operation of DU(s) over a front-haul interface. The DU may be a logical node that includes a subset of the gNB functions, depending on the functional split option. It should be noted that one of ordinary skill in the art would understand that apparatus 10 may include components or features not shown in FIG. 2a.

As illustrated in the example of FIG. 2a, apparatus 10 may include a processor 12 for processing information and executing instructions or operations. Processor 12 may be any type of general or specific purpose processor. In fact, processor 12 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 12 is shown in FIG. 2a, multiple processors may be utilized according to other embodiments. For example, it should be understood that, in certain embodiments, apparatus 10 may include two or more processors that may form a multiprocessor system (e.g., in this case processor 12 may represent a multiprocessor) that may support multiprocessing. In certain embodiments, the multiprocessor system may be tightly coupled or loosely coupled (e.g., to form a computer cluster).

Processor 12 may perform functions associated with the operation of apparatus 10, which may include, for example, precoding of antenna gain/phase parameters, encoding and decoding of individual bits forming a communication message, formatting of information, and overall control of the apparatus 10, including processes related to management of communication resources.

Apparatus 10 may further include or be coupled to a memory 14 (internal or external), which may be coupled to processor 12, for storing information and instructions that may be executed by processor 12. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 14 can be comprised of any combination of random access memory (RAM), read only memory (ROM), static storage such as a magnetic or optical disk, hard disk drive (HDD), or any other type of non-transitory machine or computer readable media. The instructions stored in memory 14 may include program instructions or computer program code that, when executed by processor 12, enable the apparatus 10 to perform tasks as described herein.

In an embodiment, apparatus 10 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 12 and/or apparatus 10.

In some embodiments, apparatus 10 may also include or be coupled to one or more antennas 15 for transmitting and receiving signals and/or data to and from apparatus 10. Apparatus 10 may further include or be coupled to a transceiver 18 configured to transmit and receive information. The transceiver 18 may include, for example, a plurality of radio interfaces that may be coupled to the antenna(s) 15. The radio interfaces may correspond to a plurality of radio access technologies including one or more of GSM, NB-IoT, LTE, 5G, WLAN, Bluetooth, BT-LE, NFC, radio frequency identifier (RFID), ultrawideband (UWB), MulteFire, and the like. The radio interface may include components, such as filters, converters (for example, digital-to-analog converters and the like), mappers, a Fast Fourier Transform (FFT) module, and the like, to generate symbols for a transmission via one or more downlinks and to receive symbols (for example, via an uplink).

As such, transceiver 18 may be configured to modulate information on to a carrier waveform for transmission by the antenna(s) 15 and demodulate information received via the antenna(s) 15 for further processing by other elements of apparatus 10. In other embodiments, transceiver 18 may be capable of transmitting and receiving signals or data directly. Additionally or alternatively, in some embodiments, apparatus 10 may include an input and/or output device (I/O device).

In an embodiment, memory 14 may store software modules that provide functionality when executed by processor 12. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software.

According to some embodiments, processor 12 and memory 14 may be included in or may form a part of processing circuitry or control circuitry. In addition, in some embodiments, transceiver 18 may be included in or may form a part of transceiving circuitry.

As used herein, the term "circuitry" may refer to hardware-only circuitry implementations (e.g., analog and/or digital circuitry), combinations of hardware circuits and software, combinations of analog and/or digital hardware circuits with software/firmware, any portions of hardware processor(s) with software (including digital signal processors) that work together to case an apparatus (e.g., apparatus 10) to perform various functions, and/or hardware circuit(s) and/or processor(s), or portions thereof, that use software for operation but where the software may not be present when it is not needed for operation. As a further example, as used herein, the term "circuitry" may also cover an implementation of merely a hardware circuit or processor (or multiple processors), or portion of a hardware circuit or processor, and its accompanying software and/or firmware. The term circuitry may also cover, for example, a baseband integrated circuit in a server, cellular network node or device, or other computing or network device.

As introduced above, in certain embodiments, apparatus 10 may be a network node or RAN node, such as a base station, access point, Node B, eNB, gNB, WLAN access point, or the like. In one example, apparatus 10 may be a master node or dual-connectivity master node (DC MN). According to certain embodiments, apparatus 10 may be controlled by memory 14 and processor 12 to perform the functions associated with any of the embodiments described herein, such as the flow or signaling diagrams illustrated in FIG. 1*b*. In some embodiments, apparatus 10 may be configured to perform a procedure for failure indication of MCG, for example.

For instance, in one embodiment, apparatus 10 may be controlled by memory 14 and processor 12 to receive an indication of failure of a MCG of a UE. The UE may be served by the apparatus 10. In response to receiving the indication, apparatus 10 may be controlled by memory 14 and processor 12 to send to the UE a command to reconfigure or configure a primary serving cell of the UE. In an embodiment, the indication may be received over an interface between the apparatus 20 and a SN. In one embodiment, the indication may indicate the cause of the failure. According to certain embodiments, the indication may indicate results of radio measurements performed by the UE. In some embodiments, the command to reconfigure the primary serving cell may be based at least in part on the measurement results. In one example, the command may be sent via the SN. In one example, the SN may be a DC SN.

Figure 2B:
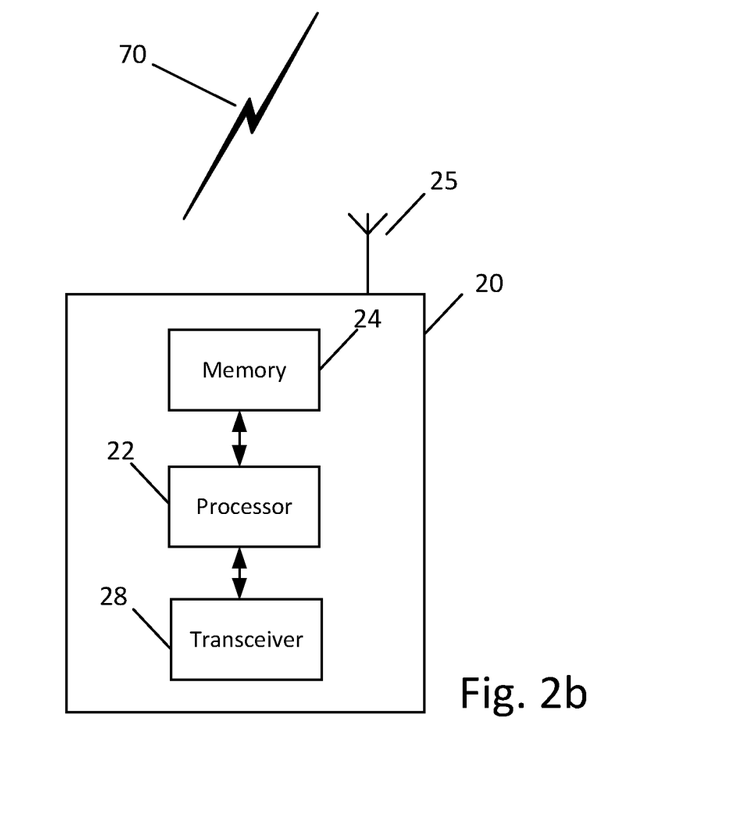
FIG. 2b illustrates an example block diagram of an apparatus, according to an embodiment.

FIG. 2*b* illustrates an example of an apparatus 20 according to another embodiment. In an embodiment, apparatus 20 may be a node or element in a communications network or associated with such a network, such as a UE, mobile equipment (ME), mobile station, mobile device, mobile termination, stationary device, IoT device, or other device. As described herein, UE may alternatively be referred to as, for example, a mobile station, mobile equipment, mobile unit, mobile device, user device, subscriber station, wireless terminal, tablet, smart phone, IoT device, sensor or NB-IoT device, or the like. As one example, apparatus 20 may be implemented in, for instance, a wireless handheld device, a wireless plug-in accessory, or the like.

In some example embodiments, apparatus 20 may include one or more processors, one or more computer-readable storage medium (for example, memory, storage, or the like), one or more radio access components (for example, a modem, a transceiver, or the like), and/or a user interface. In some embodiments, apparatus 20 may be configured to operate using one or more radio access technologies, such as GSM, LTE, LTE-A, NR, 5G, WLAN, WiFi, NB-IoT, Bluetooth, NFC, MulteFire, and/or any other radio access technologies. It should be noted that one of ordinary skill in the art would understand that apparatus 20 may include components or features not shown in FIG. 2*b*.

As illustrated in the example of FIG. 2*b*, apparatus 20 may include or be coupled to a processor 22 for processing information and executing instructions or operations. Processor 22 may be any type of general or specific purpose processor. In fact, processor 22 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 22 is shown in FIG. 2*b*, multiple processors may be utilized according to other embodiments. For example, it should be understood that, in certain embodiments, apparatus 20 may include two or more processors that may form a multiprocessor system (e.g., in this case processor 22 may represent a multiprocessor) that may support multiprocessing. In certain embodiments, the multiprocessor system may be tightly coupled or loosely coupled (e.g., to form a computer cluster).

Processor 22 may perform functions associated with the operation of apparatus 20 including, as some examples, precoding of antenna gain/phase parameters, encoding and decoding of individual bits forming a communication message, formatting of information, and overall control of the apparatus 20, including processes related to management of communication resources.

Apparatus 20 may further include or be coupled to a memory 24 (internal or external), which may be coupled to processor 22, for storing information and instructions that may be executed by processor 22. Memory 24 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 24 can be comprised of any combination of random access memory (RAM), read only memory (ROM), static storage such as a magnetic or optical disk, hard disk drive (HDD), or any other type of non-transitory machine or computer readable media. The instructions stored in memory 24 may include program instructions or computer program code that, when executed by processor 22, enable the apparatus 20 to perform tasks as described herein.

In an embodiment, apparatus 20 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 22 and/or apparatus 20.

In some embodiments, apparatus 20 may also include or be coupled to one or more antennas 25 for receiving a downlink signal and for transmitting via an uplink from apparatus 20. Apparatus 20 may further include a transceiver 28 configured to transmit and receive information. The transceiver 28 may also include a radio interface (e.g., a modem) coupled to the antenna 25. The radio interface may correspond to a plurality of radio access technologies including one or more of GSM, LTE, LTE-A, 5G, NR, WLAN, NB-IoT, Bluetooth, BT-LE, NFC, RFID, UWB, and the like. The radio interface may include other components, such as filters, converters (for example, digital-to-analog converters and the like), symbol demappers, signal shaping components, an Inverse Fast Fourier Transform (IFFT) module, and the like, to process symbols, such as OFDMA symbols, carried by a downlink or an uplink.

For instance, transceiver 28 may be configured to modulate information on to a carrier waveform for transmission by the antenna(s) 25 and demodulate information received via the antenna(s) 25 for further processing by other elements of apparatus 20. In other embodiments, transceiver 28 may be capable of transmitting and receiving signals or data directly. Additionally or alternatively, in some embodiments, apparatus 10 may include an input and/or output device (I/O device). In certain embodiments, apparatus 20 may further include a user interface, such as a graphical user interface or touchscreen.

In an embodiment, memory 24 stores software modules that provide functionality when executed by processor 22. The modules may include, for example, an operating system that provides operating system functionality for apparatus 20. The memory may also store one or more functional modules, such as an application or program, to provide additional functionality for apparatus 20. The components of apparatus 20 may be implemented in hardware, or as any suitable combination of hardware and software. According to an example embodiment, apparatus 20 may optionally be configured to communicate with a network via a wireless or wired communications link 70 according to any radio access technology, such as NR.

According to some embodiments, processor 22 and memory 24 may be included in or may form a part of processing circuitry or control circuitry. In addition, in some embodiments, transceiver 28 may be included in or may form a part of transceiving circuitry.

As discussed above, according to some embodiments, apparatus 20 may be a UE, mobile device, mobile station, ME, IoT device and/or NB-IoT device, for example. In one embodiment, apparatus 20 may include a UE configured in DC.

According to certain embodiments, apparatus 20 may be controlled by memory 24 and processor 22 to perform the functions associated with example embodiments described herein. For example, in some embodiments, apparatus 20 may be configured to perform one or more of the processes depicted in any of the flow charts or signaling diagrams described herein, such as the flow diagrams illustrated in FIG. 1a. For example, in certain embodiments, apparatus 20 may be configured to perform a procedure for failure indication of MCG, for instance.

According to some embodiments, apparatus 20 may be controlled by memory 24 and processor 22 to detect MCG RLF. According to an embodiment, apparatus 20 may be controlled by memory 24 and processor 22 to determine if the apparatus 20 is configured with SRB3 and/or a split SRB and if SCG transmissions are suspended. When the apparatus 20 is configured with a signaling radio bearer between apparatus 20 and the SN and/or a split SRB, and SCG transmissions are not suspended, apparatus 20 may be controlled by memory 24 and processor 22 to suspend MCG transmissions for radio bearers, to transmit or report a RRC indication over the signaling radio bearer and/or a SCG leg of the split SRB, and to start a timer. The signaling radio bearer comprises a direct signaling radio bearer between the apparatus 20 and the SN. The SN comprises a DC SN. According to one example, the direct signaling radio bearer may be SRB3. In an embodiment, the RRC indication may be a MCG failure information message that includes information on the cause of failure and/or the latest measurement results. According to one embodiment, the timer may be referred to as a "MCGFailTimer" and the duration of the timer may be configured to the UE by the network by RRC.

In an embodiment, when the MCG failure information is reported over an SRB terminating at the SN of apparatus 20, some or all of the information in the MCG failure information may be relayed by the SN of apparatus 20 to the MN of apparatus 20. For example, the information may be relayed to the MN over a signaling protocol used between the MN and the SN. In one example, the signaling protocol comprises X2AP/XnAP. According to certain embodiments, apparatus 20 may be controlled by memory 24 and processor 22 to stop the timer, for example MCGFailTimer, upon successful reconfiguration or configuration of the primary serving cell of apparatus 20 and/or upon reception of a command to leave RRC connected state. In an embodiment, apparatus 20 may be controlled by memory 24 and processor 22 to trigger RRC connection re-establishment upon the occurrence of at least one or more of triggering events. According to certain embodiments, the triggering event may include, while the timer is running, detecting SCG failure or integrity-verification failure on a split SRB for a PDCP PDU received over SCG. Additionally or alternatively, in an embodiment, the triggering event may include the expiration of the timer (e.g., if the MN of apparatus 20 has shut down completely).

Therefore, certain example embodiments provide several technical improvements, enhancements, and/or advantages. For example, according to certain embodiments, RRC connection re-establishment and the time-consuming cell selection that comes with it, can be avoided whenever the UE can continue communication with its Master Node over the SCG, thereby serving the purpose of fast MCG recovery. Meanwhile, communication over any radio bearers utilizing the SCG is never interrupted at all. Additionally, certain embodiments provide RRC connection re-establishment as a fall-back to avoid UE remaining in a state without an operational Primary Cell. Accordingly, the use of certain example embodiments results in improved functioning of communications networks and their nodes.

In some example embodiments, the functionality of any of the methods, processes, signaling diagrams, algorithms or flow charts described herein may be implemented by software and/or computer program code or portions of code stored in memory or other computer readable or tangible media, and executed by a processor.

In some example embodiments, an apparatus may be included or be associated with at least one software application, module, unit or entity configured as arithmetic operation(s), or as a program or portions of it (including an added or updated software routine), executed by at least one operation processor. Programs, also called program products or computer programs, including software routines, applets and macros, may be stored in any apparatus-readable data storage medium and include program instructions to perform particular tasks.

A computer program product may comprise one or more computer-executable components which, when the program is run, are configured to carry out some example embodiments. The one or more computer-executable components may be at least one software code or portions of it. Modifications and configurations required for implementing functionality of an example embodiment may be performed as routine(s), which may be implemented as added or updated software routine(s). Software routine(s) may be downloaded into the apparatus.

As an example, software or a computer program code or portions of it may be in a source code form, object code form, or in some intermediate form, and it may be stored in some sort of carrier, distribution medium, or computer readable medium, which may be any entity or device capable of carrying the program. Such carriers may include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers. The computer readable medium or computer readable storage medium may be a non-transitory medium.

In other example embodiments, the functionality may be performed by hardware or circuitry included in an apparatus (e.g., apparatus 10), for example through the use of an application specific integrated circuit (ASIC), a programmable gate array (PGA), a field programmable gate array (FPGA), or any other combination of hardware and software. In yet another example embodiment, the functionality may be implemented as a signal, a non-tangible means that can be carried by an electromagnetic signal downloaded from the Internet or other network.

According to an example embodiment, an apparatus, such as a node, device, or a corresponding component, may be configured as circuitry, a computer or a microprocessor, such as single-chip computer element, or as a chipset, including at least a memory for providing storage capacity used for arithmetic operation and an operation processor for executing the arithmetic operation.

A first embodiment may be directed to a method that may include detecting MCG RLF. When the UE is configured with at least one of a signaling radio bearer between the UE and a SN or a split SRB, and SCG transmissions are not suspended, the method may include suspending MCG transmissions for radio bearers, transmitting or reporting a RRC indication over the at least one of the signaling radio bearer between the UE and the SN, or the SCG leg of the split SRB. The method may further include starting a timer. In one example, the signaling bearer between the UE and the SN may include SRB3. Furthermore, the signaling bearer may comprise a direct signaling bearer between the UE and the SN. The SN may comprise a DC SN.

In a variant, the RRC indication may be a MCG failure information message that includes at least one of information on the cause of failure or the latest measurement results. According to a variant, the timer may be referred to as a "MCGFailTimer". The duration of the timer may be configured at the UE from the network via RRC or the duration of the timer may be configured by the UE itself.

In a variant, the MCG failure information is reported over an SRB, wherein the SRB is terminated at the UE's SN. Some or all of the information in the MCG failure information may be relayed by the UE's SN to the UE's MN. The relaying may be performed over a signaling protocol used between the MN and the SN. In one example, the signaling protocol may include X2AP/XnAP.

In a variant, the method may also include stopping the timer upon successful configuration or reconfiguration of the UE's primary serving cell and/or upon reception of a command to leave RRC connected state.

In a variant, the method may also include triggering RRC connection re-establishment upon the occurrence of at least one or more of triggering events. According to certain embodiments, the triggering events may include at least one of: i) while the timer is running, detecting SCG failure or integrity-verification failure on a split SRB for a PDCP PDU received over SCG, or ii) when the timer expires.

A second embodiment is directed to a method that may include receiving, by a MN, an indication of a RLF of a MCG configured to a UE. In response to receiving the indication, the method may further include sending to the UE a command to configure or reconfigure a primary serving cell of the UE. The UE may be served by the MN. The MN may be a DC MN.

In a variant, the indication may be received over an interface between the MN and a SN. In another variant, the indication may indicate the cause of the failure. According to a variant, the indication may indicate result of radio measurements from the UE. In a variant, the command to reconfigure or configure the primary serving cell may be based at least in part on the measurement results. In one variant, the command may be sent via the SN. The SN may be a DC SN.

Another embodiment is directed to an apparatus including at least one processor and at least one memory comprising computer program code. The at least one memory and computer program code may be configured, with the at least one processor, to cause the apparatus at least to perform the method according to the first embodiment or the second embodiment or any of their variants discussed above.

Another embodiment is directed to an apparatus that may include circuitry configured to perform the method according to the first embodiment or the second embodiment or any of their variants discussed above.

Another embodiment is directed to an apparatus that may comprise means for performing the method according to the first embodiment or the second embodiment or any of their variants discussed above.

Another embodiment is directed to a computer readable medium comprising program instructions stored thereon for performing at least the method according to the first embodiment or the second embodiment or any of their variants discussed above.

One having ordinary skill in the art will readily understand that the example embodiments as discussed above may be practiced with steps in a different order, and/or with hardware elements in configurations which are different than those which are disclosed. Therefore, although some embodiments have been described based upon these example preferred embodiments, it would be apparent to those of skill in the art that certain modifications, variations, and alternative constructions would be apparent, while remaining within the spirit and scope of example embodiments.

The invention claimed is:

1. An apparatus comprising:
   at least one processor; and
   at least one memory including computer program code;
   the at least one memory and computer program code configured to, with the at least one processor, cause the apparatus at least to:
      detect a radio link failure of a master cell group;
      suspend master cell group transmission for radio bearers, based on the detecting;
      transmit or report a radio resource control indication over at least one of a signaling radio bearer between the apparatus and a secondary node, or a secondary cell group leg of a split signaling radio bearer, wherein the radio resource control indication comprises a master cell group failure information message;
      start a timer upon transmitting or reporting the radio resource control indication, wherein the timer comprises a MCGFailTimer; and
      stop the timer upon at least one of successful configuration or reconfiguration of the apparatus's primary serving cell, or reception of a command to leave radio resource control connected state.

2. The apparatus of claim 1, wherein the at least one memory and computer program code further configured to, with the at least one processor, cause the apparatus at least to:
   determine that the apparatus is configured with at least one of the signaling radio bearer between the apparatus and the secondary node or the split signaling radio bearer, and determining that secondary cell group transmission is not suspended.

3. The apparatus of claim 1, wherein duration of the timer is configured at the apparatus from the network via radio resource control.

4. The apparatus of claim 1, wherein duration of the timer is configured by the apparatus itself.

5. The apparatus of claim 1, wherein the at least one memory and computer program code further configured to, with the at least one processor, cause the apparatus at least to:
trigger radio resource control connection re-establishment upon occurrence of at least one triggering event.

6. The apparatus of claim 5, wherein the at least one triggering event includes at least one of: i) while the timer is running, detecting secondary cell group failure or integrity-verification failure on a split signaling radio bearer for a PDCP PDU received over secondary cell group, or ii) when the timer expires.

7. The apparatus of claim 1, wherein the signaling radio bearer between the apparatus and the secondary node comprises Signaling Radio Bearer 3.

8. The apparatus of claim 1, wherein the signaling radio bearer comprises a direct signaling bearer between the apparatus and the secondary node.

9. The apparatus of claim 1, wherein the secondary node comprises a dual connectivity secondary node.

10. The apparatus of claim 1, wherein the master cell group failure information message comprises at least one of information on cause of failure or latest measurement result.

11. The apparatus of claim 1, wherein a master cell group failure information is reported over a signaling radio bearer, wherein the signaling radio bearer is terminated at the secondary node.

12. The apparatus of claim 11, wherein some or all of information in the master cell group failure information is relayed from the secondary node to a master node.

13. The apparatus of claim 12, wherein the relaying is performed over a signaling protocol used between the master node and the secondary node.

14. The apparatus of claim 13, wherein the signaling protocol includes at least one of X2AP or XnAP.

15. An apparatus comprising:
at least one processor; and
at least one memory including computer program code;
the at least one memory and computer program code configured to, with the at least one processor, cause the apparatus at least to:
receive an indication of a radio link failure of a master cell group configured to a user equipment, wherein the indication is received over an interface between the apparatus and a secondary node; and
in response to the receiving the indication, send to the user equipment a command to configure or reconfigure a primary serving cell of the user equipment or a command to leave radio resource control connected state,
wherein at least one of successful configuration or reconfiguration of the primary serving cell of the user equipment or leaving the radio resource control connected state causes a timer stop, and
wherein the timer comprises a MCGFailTimer, and is started upon transmission or report of the indication of the radio link failure of the master cell group from the user equipment.

16. The apparatus of claim 15, wherein the indication indicates at least one of cause of the radio link failure, or result of radio measurement from the user equipment.

17. A method, comprising:
detecting, by a user equipment, a radio link failure of a master cell group;
suspending master cell group transmission for radio bearers, based on the detecting;
transmitting or reporting a radio resource control indication over at least one of a signaling radio bearer between the user equipment and a secondary node, or a secondary cell group leg of a split signaling radio bearer, wherein the radio resource control indication comprises a master cell group failure information message;
starting a timer upon transmitting or reporting the radio resource control indication, wherein the timer comprises a MCGFailTimer; and
stopping the timer upon at least one of successful configuration or reconfiguration of the user equipment's primary serving cell, or reception of a command to leave radio resource control connected state.

18. The method of claim 17, further comprising:
determining that the user equipment is configured with at least one of the signaling radio bearer between the user equipment and the secondary node or the split signaling radio bearer, and determining that secondary cell group transmission is not suspended.

19. The method of claim 17, wherein the signaling radio bearer between the user equipment and the secondary node comprises Signaling Radio Bearer 3.

20. The method of claim 17, wherein the signaling radio bearer comprises a direct signaling bearer between the user equipment and the secondary node.

* * * * *